(12) United States Patent
Lively et al.

(10) Patent No.: US 9,663,249 B2
(45) Date of Patent: May 30, 2017

(54) DUAL SPACECRAFT DESIGN AND DEPLOYMENT SYSTEM AND METHOD OF USE THEREOF

(71) Applicants: Carey Lively, Bowie, MD (US); Eric Thorstenson, Potomac Falls, VA (US)

(72) Inventors: Carey Lively, Bowie, MD (US); Eric Thorstenson, Potomac Falls, VA (US)

( * ) Notice: Subject to any disclaimer, the term of this patent is extended or adjusted under 35 U.S.C. 154(b) by 137 days.

(21) Appl. No.: 14/620,044

(22) Filed: Feb. 11, 2015

(65) Prior Publication Data

US 2015/0232205 A1 Aug. 20, 2015

Related U.S. Application Data

(60) Provisional application No. 61/940,192, filed on Feb. 14, 2014.

(51) Int. Cl.
| | |
|---|---|
| *B64C 37/02* | (2006.01) |
| *B64D 5/00* | (2006.01) |
| *B64G 1/00* | (2006.01) |
| *B64G 1/64* | (2006.01) |

(52) U.S. Cl.
CPC ............ *B64G 1/002* (2013.01); *B64G 1/641* (2013.01); *B64G 2001/643* (2013.01)

(58) Field of Classification Search
CPC ........ B64G 1/002; B64G 1/222; B64G 1/641; B64G 1/645; B64G 1/1085; B64G 2001/643; B64G 2001/64
See application file for complete search history.

(56) References Cited

U.S. PATENT DOCUMENTS

| | | | | | |
|---|---|---|---|---|---|
| 4,300,737 | A | * | 11/1981 | Byrne | B64G 1/641 244/173.1 |
| 4,355,775 | A | * | 10/1982 | Ganssle | B64G 1/645 244/173.3 |
| 5,199,672 | A | * | 4/1993 | King | B64G 1/007 244/164 |
| 5,605,308 | A | * | 2/1997 | Quan | B64G 1/641 102/489 |
| 5,720,450 | A | * | 2/1998 | Kanne | B64G 5/00 244/118.1 |
| 5,884,866 | A | | 3/1999 | Steinmeyer et al. | |
| 6,138,951 | A | | 10/2000 | Budris et al. | |

(Continued)

*Primary Examiner* — Philip J Bonzell
(74) *Attorney, Agent, or Firm* — Arent Fox LLP

(57) ABSTRACT

The Dual Spacecraft Deployment System (DSDS) is a concept developed for deploying Dual Satellites into independent orbits from a single launch vehicle. The Deployment Concept, Deployment System and Spacecraft Design with Representative Instruments are presented herein. The design employs an innovative half-hex design for the spacecraft buses which allows the spacecraft to be accommodated in a parallel mounted configuration on the launch vehicle. The Spacecraft are arranged on the launch vehicle with a central deployment structure with a deployment mechanism which allows independent lateral deployment of two spacecraft. The Spacecraft Design can have a large volume, e.g., sized to accommodate Spacecraft Sub-systems and Instrument Systems. This concept allows the launch vehicle to accommodate two large Spacecraft deployed to different orbits with a single launch doubling the efficiency of the launch vehicle.

26 Claims, 11 Drawing Sheets

(56) References Cited

U.S. PATENT DOCUMENTS

| | | | | |
|---|---|---|---|---|
| 6,296,206 B1 * | 10/2001 | Chamness | ................ | B64G 1/00 244/173.3 |
| 6,557,802 B2 * | 5/2003 | Kroeker | ................ | B64G 1/002 244/173.3 |
| 2002/0079406 A1 * | 6/2002 | Kroeker | ................ | B64G 1/002 244/173.3 |

* cited by examiner

DSDS Spacecraft and Deployment Structure

Spacecraft Bus Layout, Internal

Launch Lock Deployment Sequence

DUAL SPACECRAFT DESIGN AND DEPLOYMENT SYSTEM AND METHOD OF USE THEREOF

CROSS-REFERENCE TO RELATED APPLICATION

This application claims the benefit of U.S. application Ser. No. 61/940,192, entitled "Spacecraft Design, Deployment System for Dual Spacecraft Deployment and Method of Use Thereof" and filed on Feb. 14, 2014, which is expressly incorporated by reference herein in its entirety.

BACKGROUND

Field

The present disclosure relates generally to the design of spacecraft and a deployment system and a concept for deploying two spacecraft into two independent satellite orbits from a single launch vehicle.

Description of the Related Art

The current state of the art for launching two large spacecraft into orbit employs a concept where the spacecraft are mounted in a position of one spacecraft vertically above a second spacecraft in a configuration making use of a launch vehicle provided mechanism for the launch of two spacecraft sometimes referred to as a "dual payload attach fitting (DPAF)".

Launch vehicles may provide this or the spacecraft may employ their own "payload attach fitting".

However, the existing DPAF system is less efficient because it requires more launch vehicle payload support mass and provides less spacecraft mass to orbit, constrains the volume of the Spacecraft and constrains the flexibility of the spacecraft to launch vehicle separation and operation.

SUMMARY

The Dual Spacecraft Deployment System (DSDS) concept offers a new and more efficient method of deploying two spacecraft, referred to as payload by the launch vehicle, into different satellite orbits from a single launch vehicle. With this concept the dual spacecraft employ a new concept called a DSDS which employ a parallel spacecraft mounted to a deployment structure in a parallel configuration on the launch vehicle.

Aspects of the DSDS include an innovative half-hexagon design for the Spacecraft Buses and a lightweight deployment support structure providing the interface to the launch vehicle. The DSDS may be used with a mechanically actuated release system, allowing independent release of the two Spacecraft from the Launch vehicle, as well as tailoring of the release sequence for each satellite. This concept deploys the satellites, in a lateral direction to the launch vehicle flight path. The Satellites may be deployed separately in a sequence which allows each satellite to be placed in an independent mission orbit. The spacecraft may be sized such that one spacecraft may carry extra propulsion and therefore carrying extra Propulsion to achieve a different orbit and meet different mission requirements. The basic bus geometry and deployment structure may be configured to be lightweight and may be readily scaled to accommodate different instrument payloads and launch vehicle fairings. The proposed deployment concept may also include a release actuation mechanism which allows independent deployment.

Additional advantages and novel features of aspects of the present invention will be set forth in part in the description that follows, and in part will become more apparent to those skilled in the art upon examination of the following or upon learning by practice thereof.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be appreciated that these examples are merely illustrative of aspects of the present invention. Many variations and modifications will be apparent to those skilled in the art.

The Dual Spacecraft Deployment System (DSDS) is a concept developed for deploying Dual Satellites into independent orbits from a single launch vehicle. Aspects of the Deployment Concept, Deployment System and Spacecraft Design with Representative Instruments are presented herein. The design employs an innovative half-hex design for the spacecraft buses which allows the spacecraft to be accommodated in a parallel mounted configuration on the launch vehicle. The Spacecraft may be arranged on the launch vehicle with a central deployment structure with a deployment mechanism which allows independent lateral deployment of two spacecraft. The Spacecraft Design can have a large volume, e.g., sized to accommodate Spacecraft Sub-systems and Instrument Systems. This concept allows the launch vehicle to accommodate two large Spacecraft deployed to different orbits with a single launch doubling the efficiency of the launch vehicle.

Deployment Structure and Spacecraft

Figure 1:
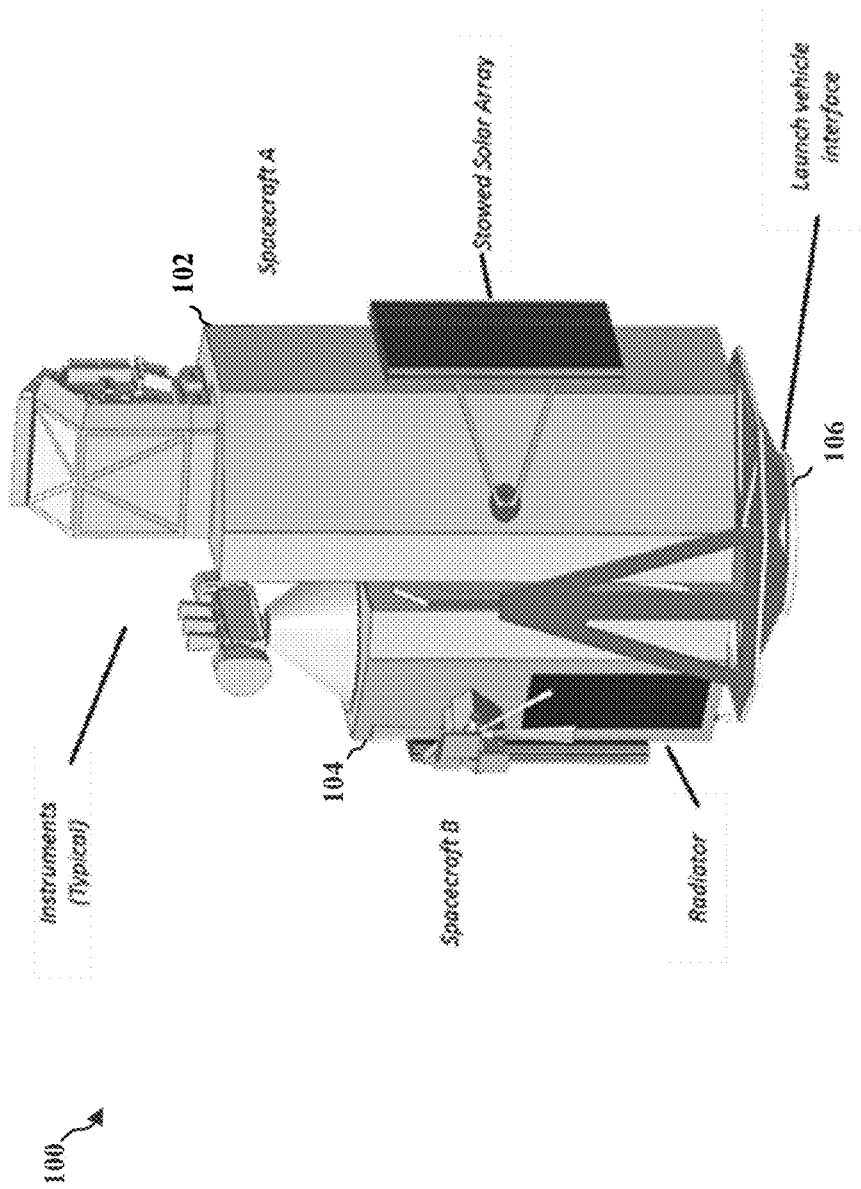
FIG. 1 illustrates aspects of an example DSDS spacecraft and deployment structure.
Figure 2:
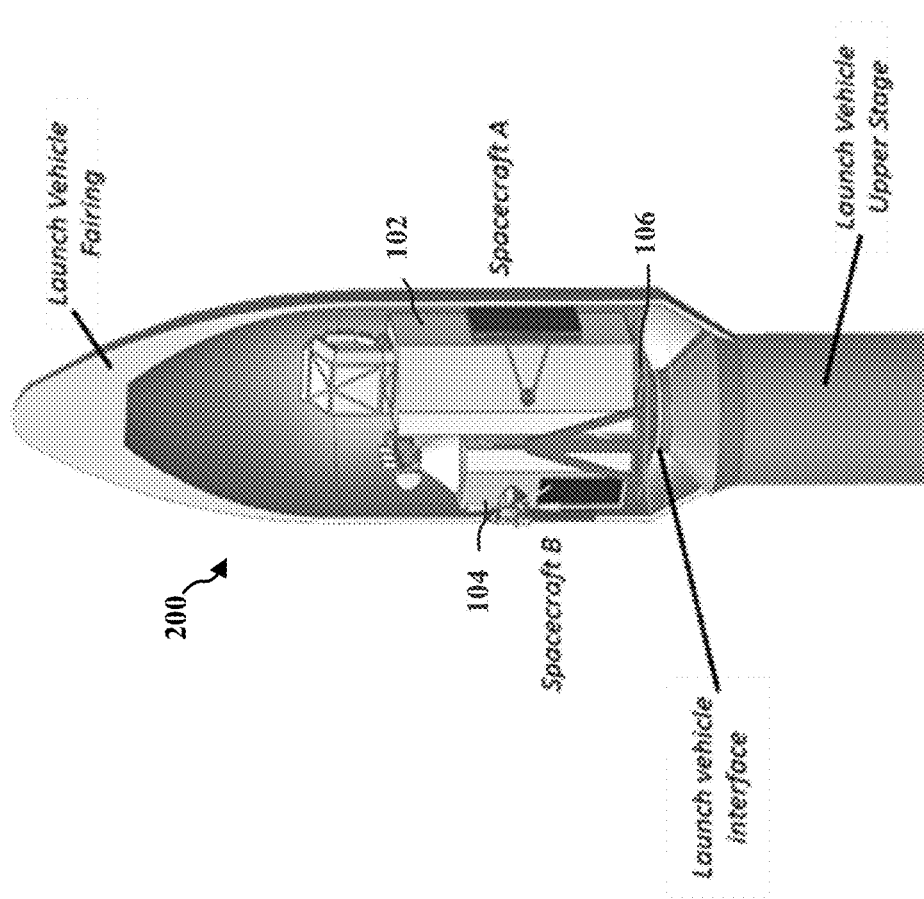
FIG. 2 illustrates aspects of an example DSDS spacecraft and deployment structure positioned inside a launch vehicle fairing.

The DSDS configuration comprises of two 'half-hex' spacecraft buses and instrument payloads mated to a common deployment structure. The structure forms the interface between the spacecraft and the launch vehicle (L/V), providing an efficient load path between the base of the spacecraft and the L/V. The major structural components may comprise a honeycomb composite, with secondary structure (support members, panel joining hardware) being made of, e.g., composite or aluminum. The geometry and layout of the structure is such that it can readily be scaled to accommodate larger or smaller spacecraft and may be adaptable to different launch vehicles and different sized launch vehicle fairings. FIGS. 1 and 2 illustrate such aspects. For example, FIG. 1 illustrates a DSDS spacecraft and deployment structure 100, and FIG. 2 illustrates the DSDS spacecraft and deployment structure of FIG. 1 while housed within a launch vehicle fairing 200. For example, FIG. 1 shows half hexagon shaped spacecraft A 102 and half hexagon shaped spacecraft B 104 positioned on launch vehicle interface 106. The spacecraft may be sized to have a large volume, e.g., to accommodate spacecraft sub-systems and provide ample volume for accommodating instrument sub-systems internally and externally.

Deployment Sequence

Figure 3:
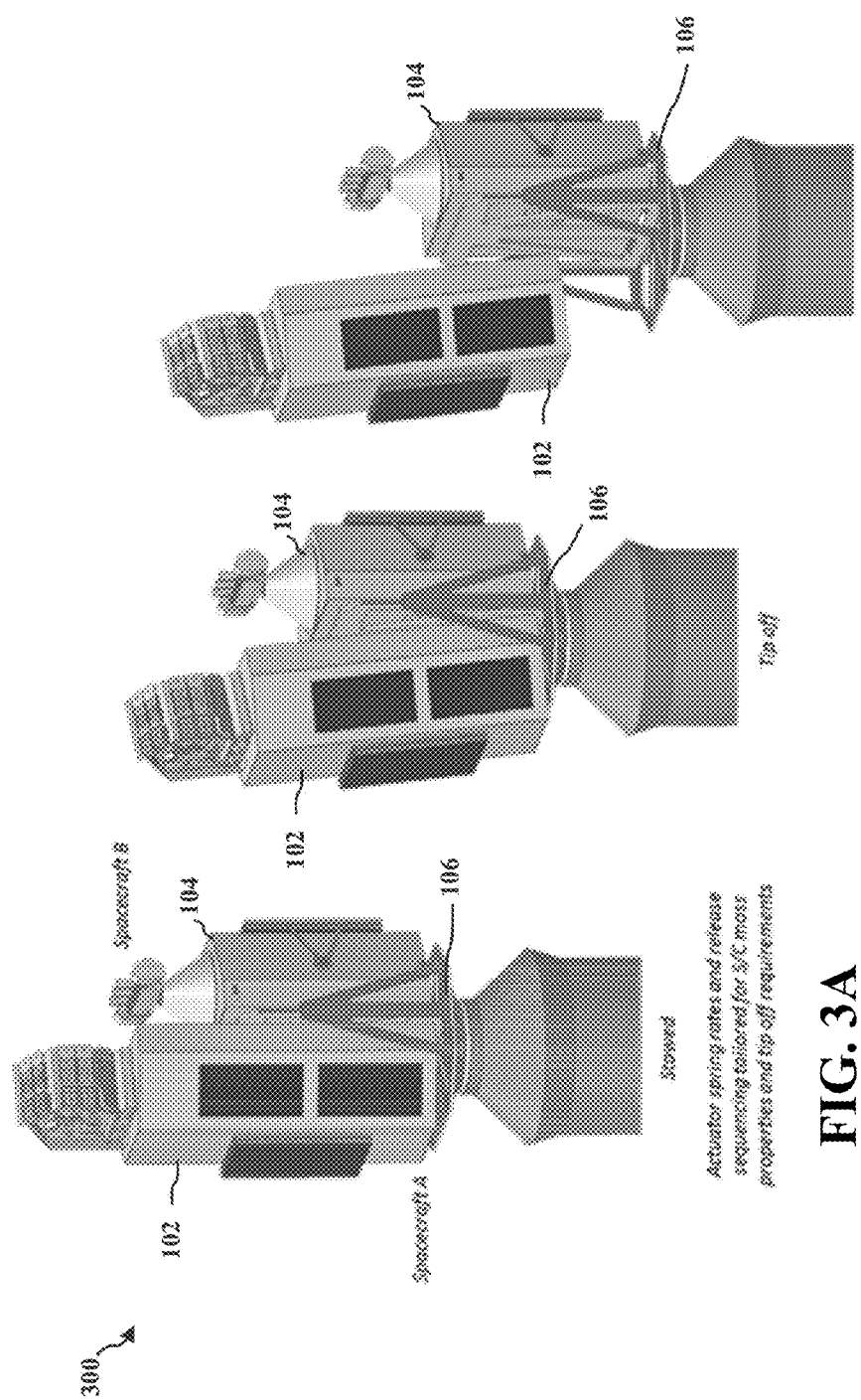
FIGS. 3A, 3B, and 3C illustrate aspects of an example DSDS deployment sequence.

The DSDS structure and release mechanisms are designed to support independent deployment of each spacecraft in a lateral direction, and allow insertion of the spacecraft into different orbits to meet different mission requirements. The spacecraft may be deployed in a sequence which best meets mission goals. The sequence which is shown in FIGS. 3A, 3B, and 3C show an example deployment 300 in a sequence with a Spacecraft A separation and then a Spacecraft B separation from the launch vehicle. FIG. 3A illustrates Spacecraft A 102 and Spacecraft B 104 positioned on launch vehicle interface 106. FIG. 3B illustrates Spacecraft A being deployed by being tipped off of the launch vehicle interface 106. FIG. 3C illustrates Spacecraft A 102 deployed from the launch vehicle interface 106. However, different deployment sequences may be used in order to best meet mission requirements. For example, possible deployment scenarios may include any of:

1. A sequence with Spacecraft A is deployed from the launch vehicle, while Spacecraft B placed into an alternate orbit by the launch vehicle, as illustrated in FIG. 3 having a typical launch vehicle upper stage. The placement into an alternate orbit may be achieved, e.g., by releasing Spacecraft B at a different time than Spacecraft A and by restarting the system and moving to a second position before releasing Spacecraft B.

2. An alternate sequence (not shown) with Spacecraft B deployed from the launch vehicle, while Spacecraft A may be placed into an alternate orbit by the launch vehicle and/or may use any added propulsion capability of Spacecraft A.

Aspects include a mechanical deployment system which employs a single point release actuator and spring energy for deployment. The spring rates and timing of the actuator release for each spacecraft may be tailored to accommodate varying payload masses and desired tip-off rates and spacecraft separation, as illustrated in FIG. 3.

Half-Hex Spacecraft Configuration

Figure 4:
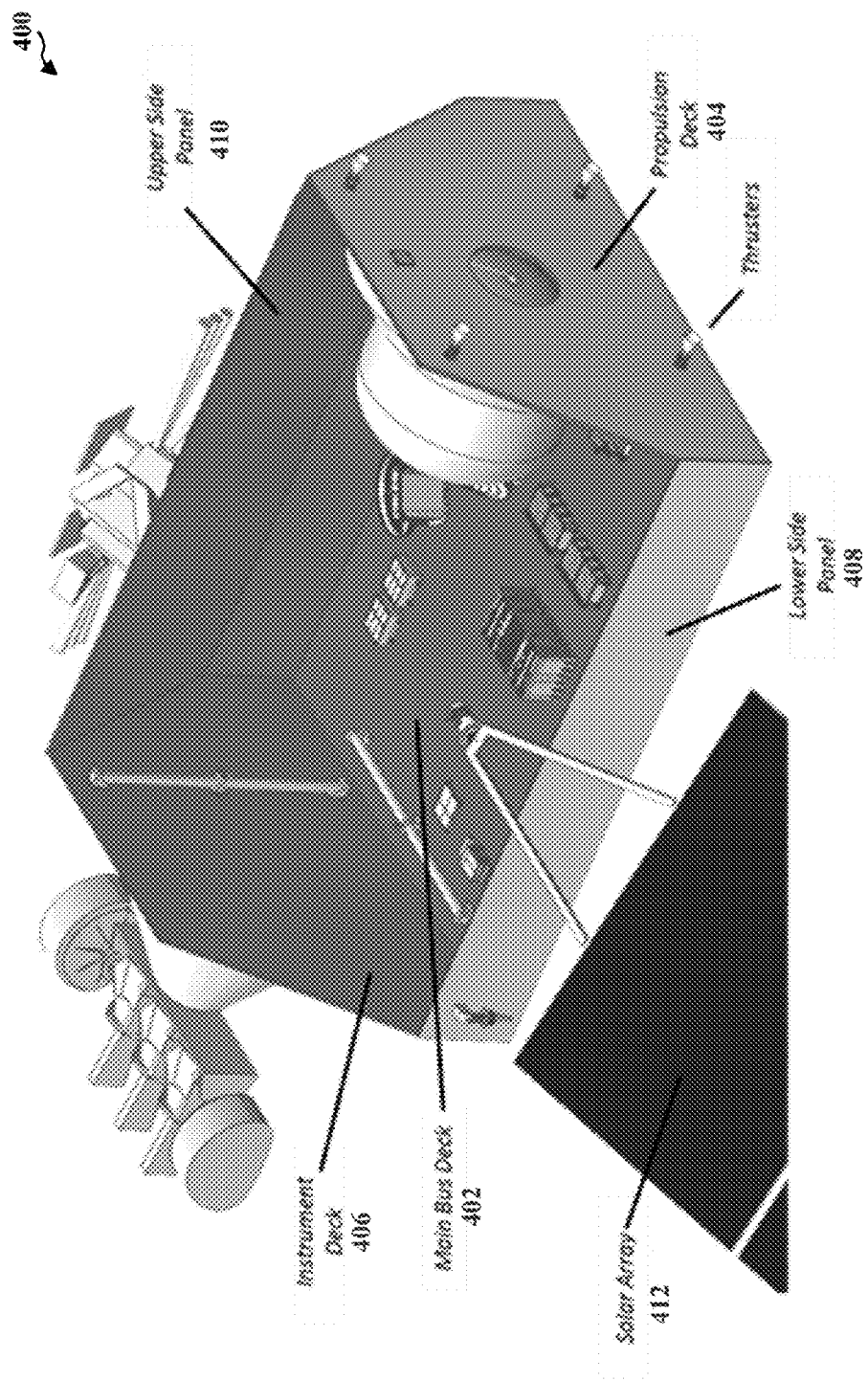
FIG. 4 illustrates aspects of an example spacecraft bus layout, open to show aspects of the interior.

Each of the spacecraft in the DSDS comprises of a basic half-hexagonal bus structure, supporting power and operational hardware, and one or more instrument payloads. FIG. 4 illustrates aspects of an interior of a spacecraft 400. The majority of the bus components may be accommodated, e.g., on two primary panels, the Main Bus Deck 402 and the Propulsion Deck 404. The Instruments may be accommodated primarily on the Instrument Deck 406. The Lower Side 408 and Upper Side 410 panels may support solar array 412 and radiator orientations typical of low earth orbit missions, and may be designed to be removable for easy internal access. The overall bus configuration simplifies design and facilitates easy access for component installation, integration and test. There is ample volume to accommodate spacecraft sub-systems and instrument sub-systems.

Figure 5:
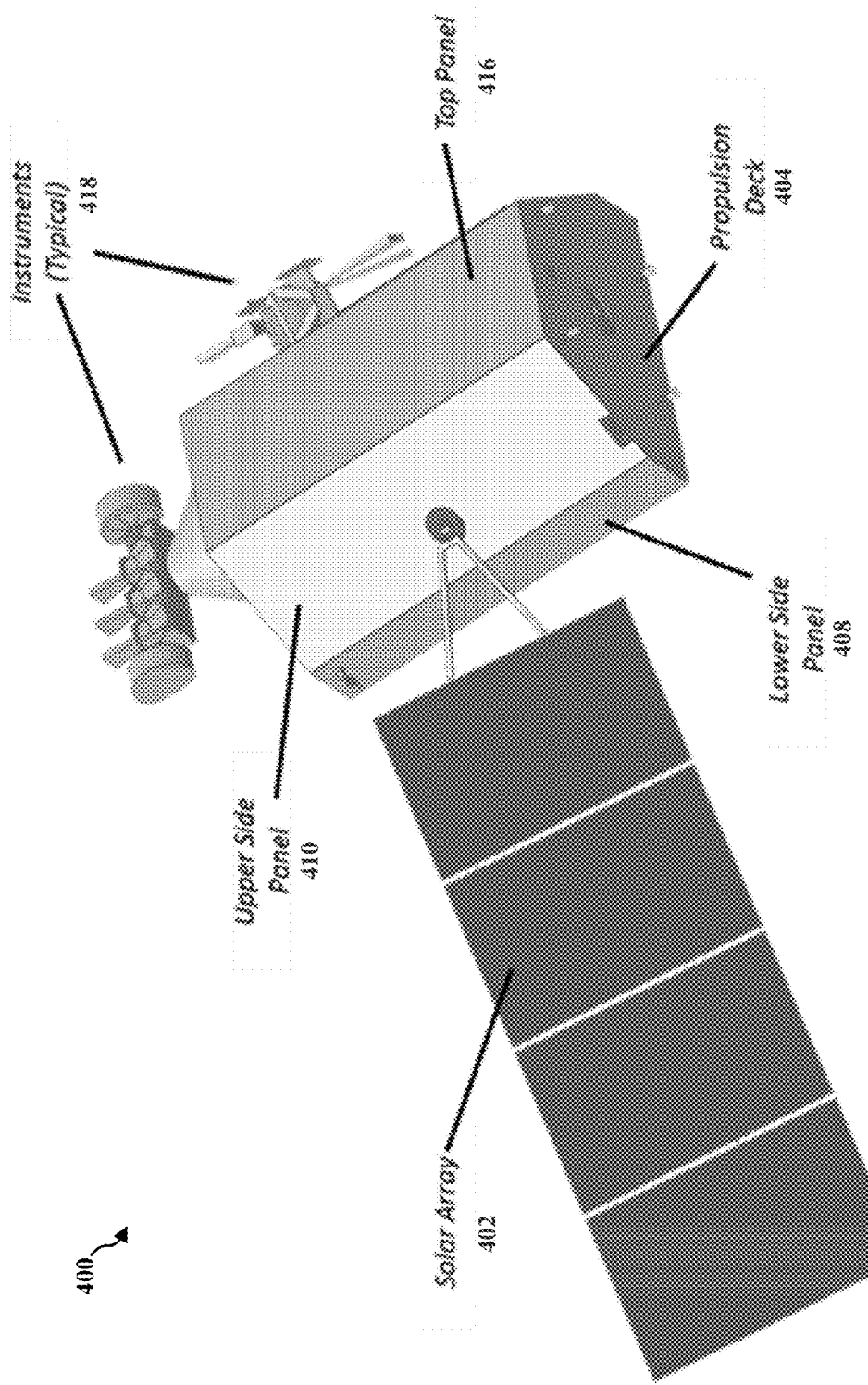
FIG. 5 illustrates aspects of an example exterior of a spacecraft bus layout.
Figure 6:
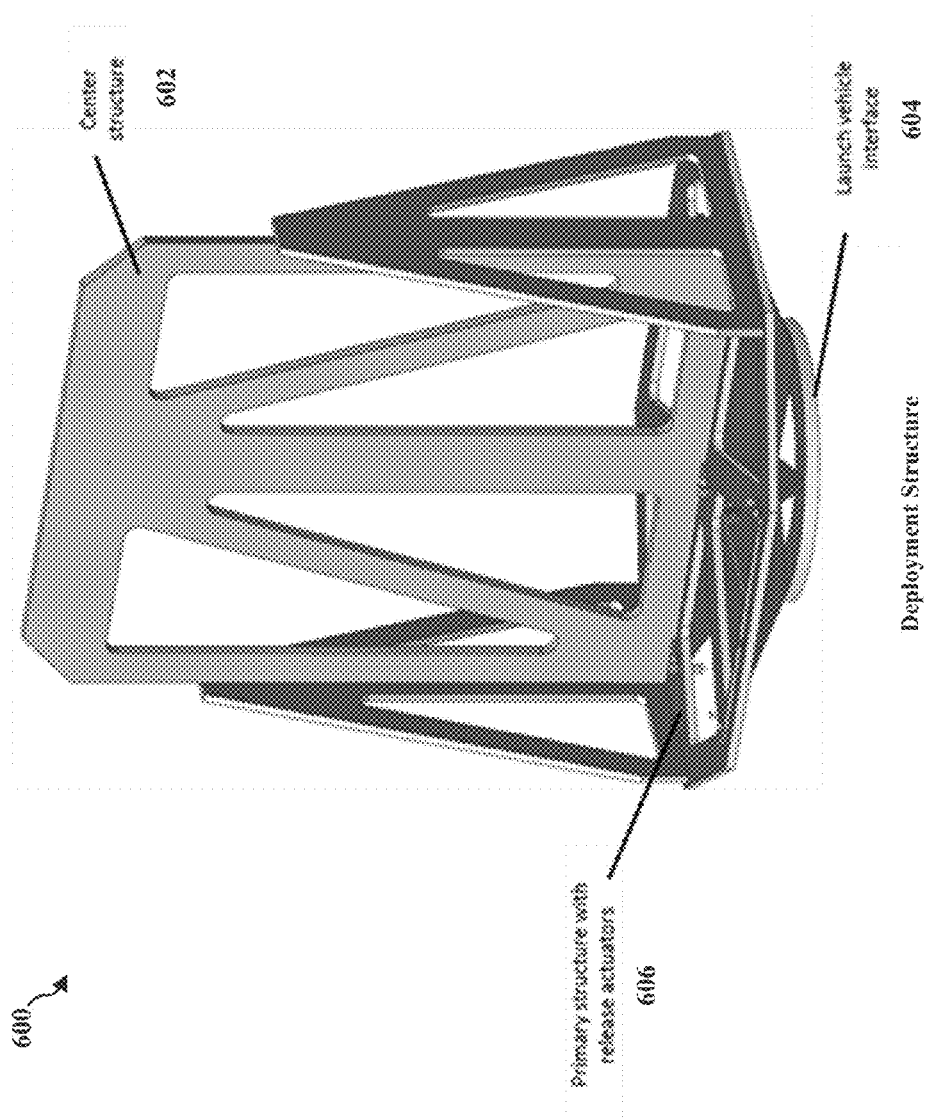
FIG. 6 illustrates the deployment structure of the system.

A typical layout houses all major bus components (electrical, power systems, navigation, data processing, communication, and attitude control) on the Main Bus Deck 402. A propulsion system and tank may be integrated independently on the Propulsion Deck 404, as illustrated in FIGS. 4 and 5. FIG. 5 illustrates the spacecraft 400 having a top panel 416 in place and additional instruments 418 provided on panels of the spacecraft, FIG. 6 illustrates an example, common deployment structure for releasing two spacecraft from a launch vehicle, also referred to herein as a launch vehicle interface. The deployment structure 600 comprises a center structure 602 that is positioned between the two spacecraft and an interface 604 to connect to a launch vehicle, such as launch vehicle 200 in FIG. 2. The deployment structure also includes a base 606 with release actuators for releasably attaching to two spacecraft. The deployment structure also includes a release system provided on the common deployment support structure, the release mechanism being configured to release the two spacecraft in a direction lateral to a flight path of the launch vehicle.

DSDS Deployment Mechanism and Launch Latches

Figure 7:
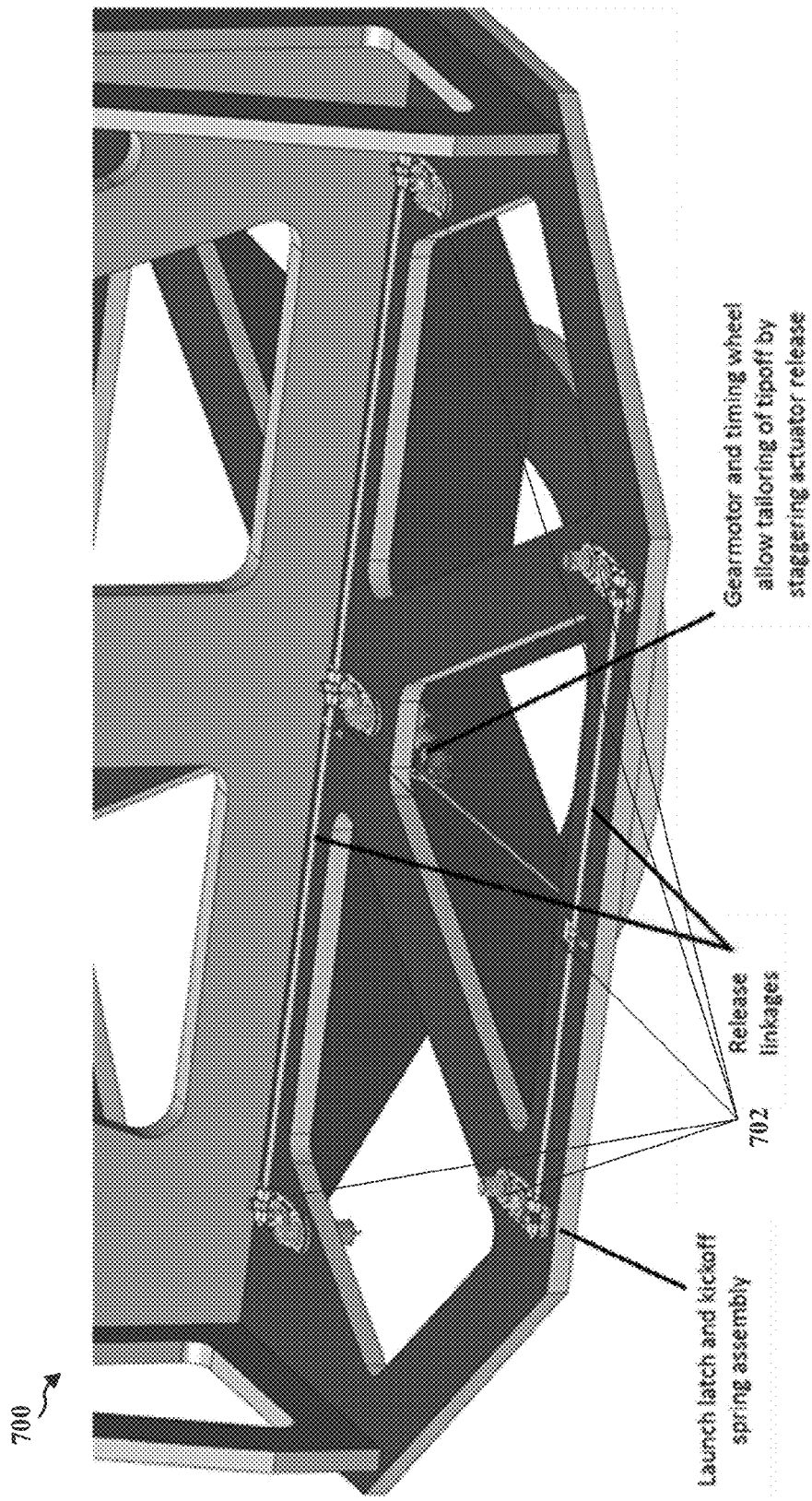
FIG. 7 illustrates aspects of an example deployment mechanism and release actuator layout.

The DSDS may comprise a mechanically actuated release system, allowing independent release of the two payload spacecraft, as well as tailoring of the release sequence for each spacecraft. Each release actuator assembly may be integrated separately to the DSDS structure. The release actuators are driven by a common gear-motor, timing wheel, and linkage assembly. The gear-motor allows easy integration, testing and resetting of the system. The timing wheel allows the two planes of actuators to be staggered slightly with respect to one another, to fine tune spacecraft tip-off rates. As illustrated in the deployment structure 700 of FIG. 7, each spacecraft can be supported at a plurality of points 702 between its propulsion deck and the DSDS structure. For example, FIG. 7 illustrates an example showing five points 702. At least two of the points are provided on the outer edge of the deployment structure. Among other benefits, this placement enables the "tip-off" movement of the payload spacecraft when the latch releases the payload structure, thereby allowing the compressed spring to engage the payload spacecraft, pushing it away from the deployment structure. FIG. 7 illustrates two of such points at the outer circumference of the deployment structure.

Each launch lock assembly comprises a launch vehicle interface, a spacecraft interface, a cup and cone assembly, a kickoff spring and housing, and the launch latch itself Aspects of the launch lock assembly 800 are illustrated in connection with FIGS. 8 and 9A, 9B, and 9C. The launch vehicle interface and spacecraft interface are developed and tested as a set, but integrated separately to the launch vehicle and spacecraft prior to installation of the spacecraft on the DSDS. The cup/cone assembly 802 provides the load path for the assembly, carrying all longitudinal and lateral loads between the L/V and spacecraft. The kickoff spring 804 provides a positive deployment force at each launch lock location, and can be adjusted within the housing to vary the preload against the spacecraft interface as necessary. The launch latch 806 provides the retaining force keeping the spacecraft captive in the stowed configuration. The profile of the launch latch is designed to provide low shock operation during its initial motion and release of the spacecraft. This operation occurs because the mechanical actuators can operate so as to gradually unload the preload as the latch releases the payload spacecraft.

Figure 8:
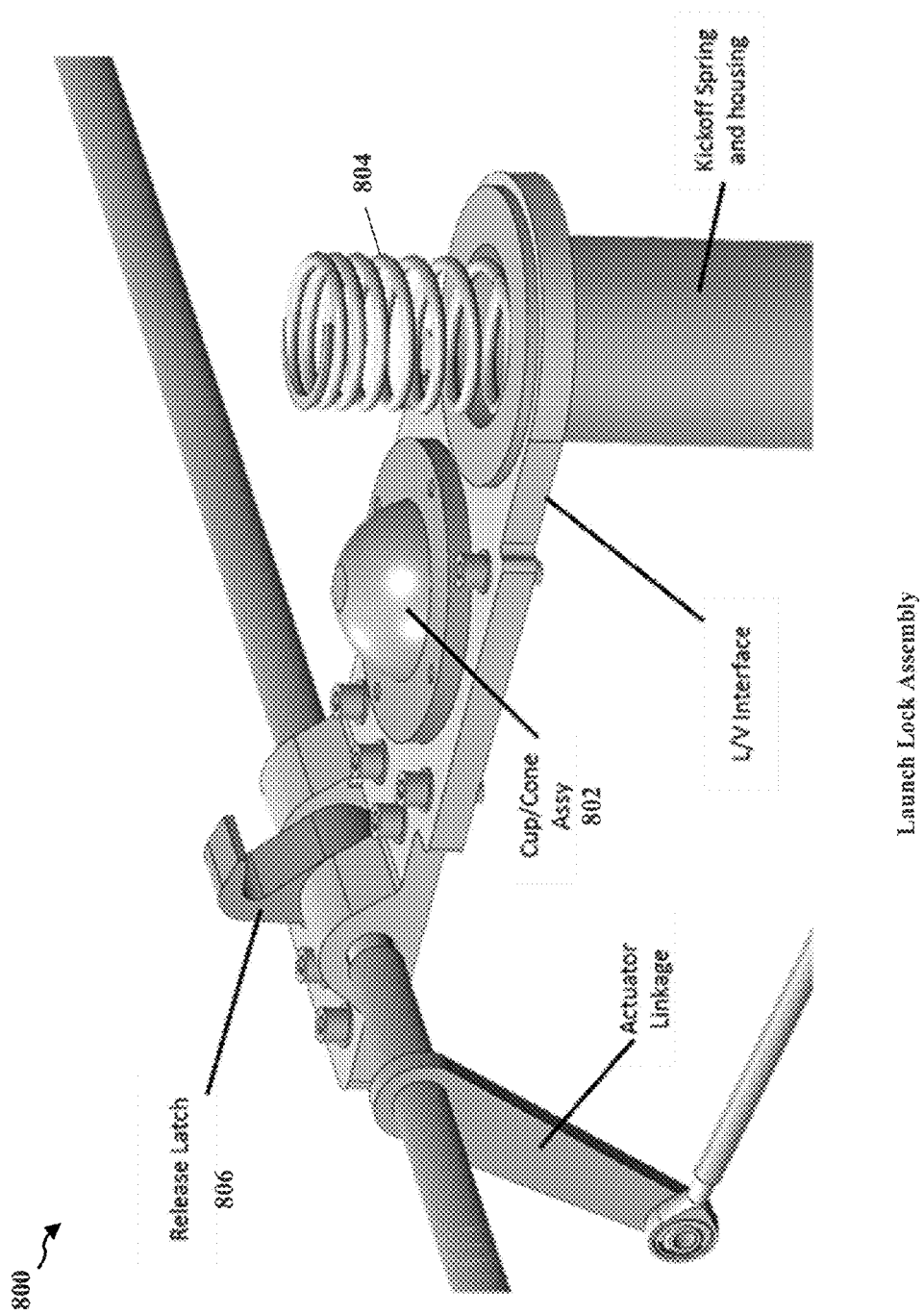
FIG. 8 illustrates aspects of an example launch lock assembly.
Figures 9A, 9B, 9C:
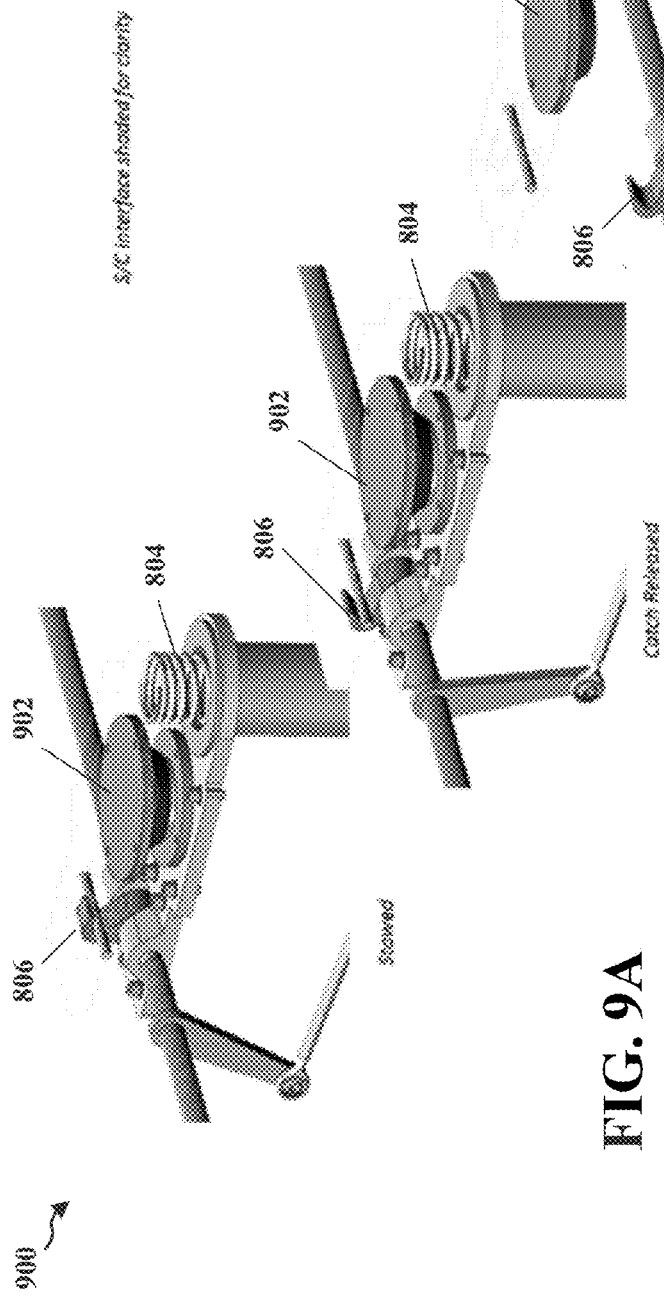
FIGS. 9A, 9B, and 9C illustrate aspects of an example launch lock deployment sequence.

Each of the spacecraft is supported at a plurality of points between its propulsion deck and the DSDS structure, e.g., five points as illustrated in the example in FIG. 7. The spacecraft is integrated to the DSDS by first placing the gear-motor and launch locks on the DSDS in a deployed position. The DSDS structure also includes a cone that is configured to receive a corresponding cup 902 provided on the spacecraft. In the deployed position, the launch locks are rotated to receive a corresponding latching element coupled to the spacecraft. For example, this may also be referred to as an open position. The spacecraft is then lowered into position on the DSDS. This can be achieved, among other ways by using a crane as a placement mechanism. As the spacecraft is lowered into position, the latching element is brought into position near the launch lock, also referred to herein as being received into the launch latch. Additionally, as the spacecraft is lowered into a latching position, the cone provided at the DSDS comes into contact with the cup coupled to the spacecraft. After the spacecraft is positioned on the DSDS such that the cups and cones are aligned and fully contacting one another, the launch locks may be placed in the stowed configuration. For example, the gearmotor is used to rotate the latch into a closed position around the corresponding latching element provided at the spacecraft. This preloads the cups and cones and locks the spacecraft in position on the DSDS. FIG. 8 illustrates aspects of the launch latch assembly. FIGS. 9A, 9B, and 9C illustrate aspects of the launch lock deployment sequence 900.

Figure 10:
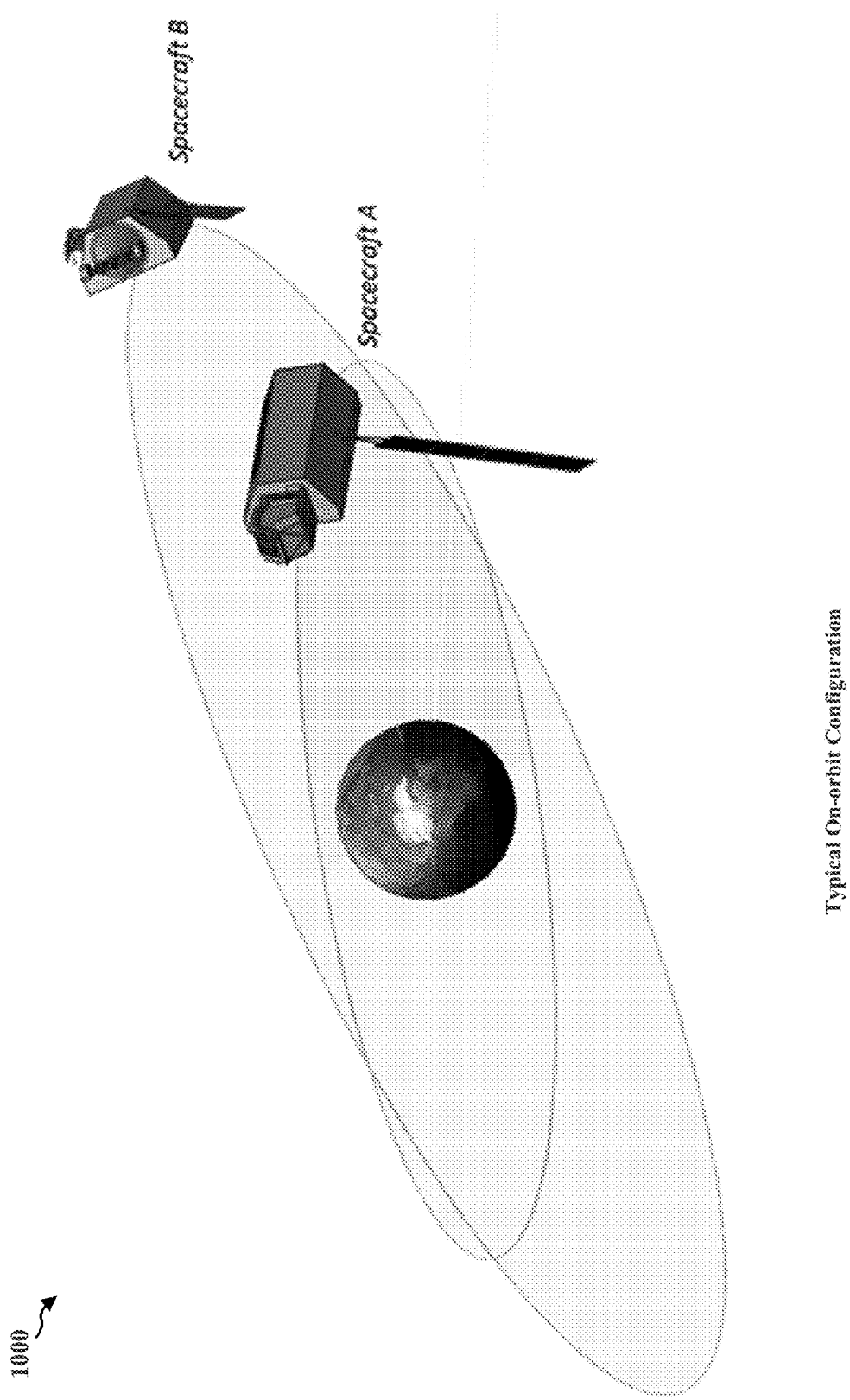
FIG. 10 illustrates an example orbit scenario after deployment of the two spacecraft.

FIG. 10 illustrates an example orbit scenario after deployment of the two spacecraft after deployment.

Figure 11:
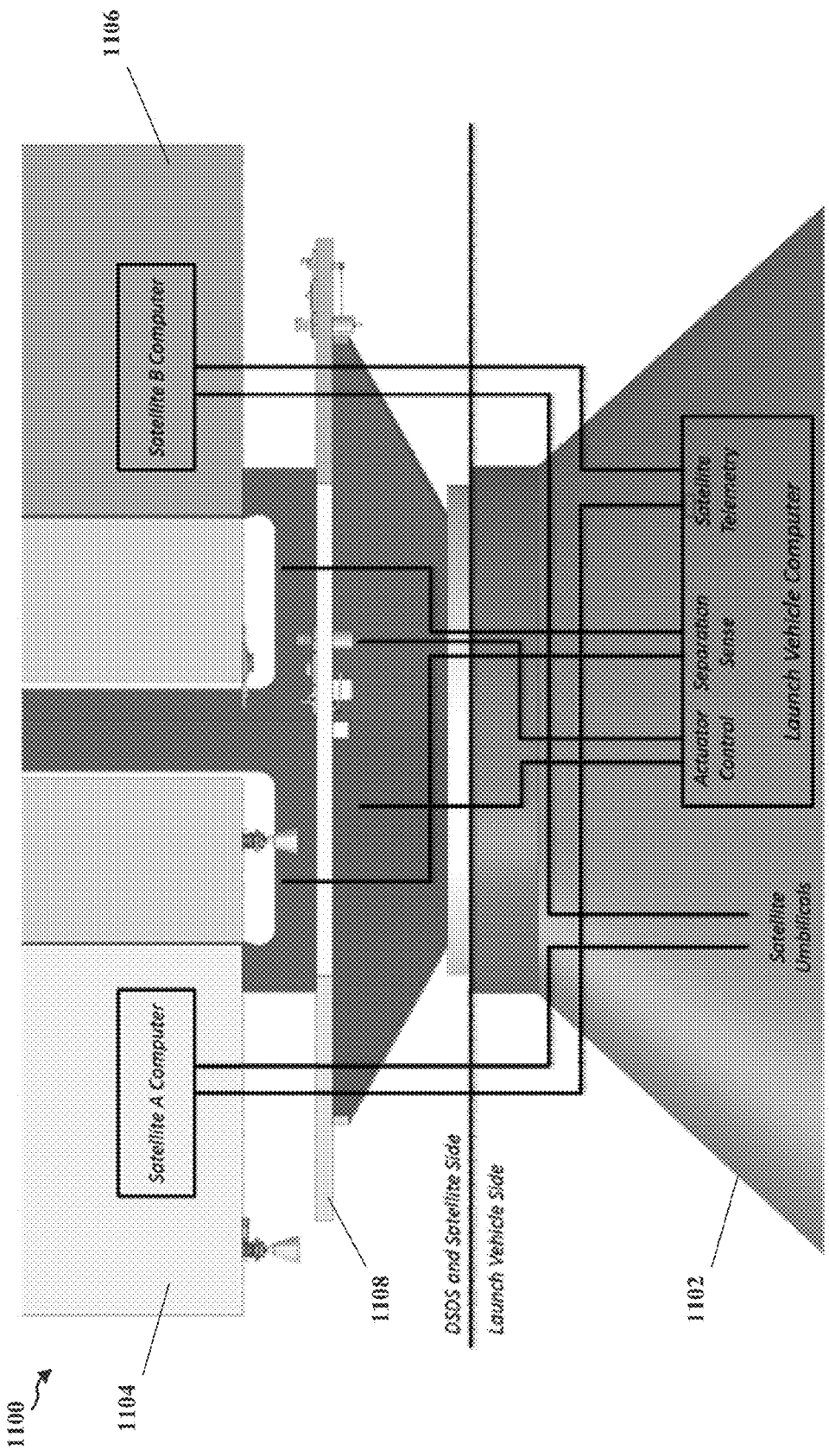
FIG. 11 illustrates an example system diagram of various hardware components and other features, for use in accordance with aspects of a control system for controlling the separation of the spacecraft from the deployment system.

FIG. 11 illustrates an example block diagram 1100 of the launch vehicle and spacecraft interface. Actuation of the gearmotors controlling the satellite release would typically be initiated by the launch vehicle 1102 after determination of proper orbit insertion for each spacecraft, spacecraft A 1104 an Spacecraft B 1106. A separation sense circuit provides feedback to the launch vehicle computer upon separation of the satellites from the deployment structure 1108. Each satellite's main computer is connected to the launch vehicle computer for purposes of providing telemetry and status during launch. The main computer of each satellite is also connected to an umbilical cable, passing through the launch vehicle structure for ground operations and testing of the spacecraft prior to launch. Both the umbilical and telemetry connections to the satellite computers are made via low friction, non-locking connectors so as not to impair the satellite deployment.

The Dual Spacecraft Satellite Deployment (DSDS) is a concept and system for deploying Spacecraft laterally from a launch vehicle into orbit about the earth as satellites. This system is a new concept which is employed to launch two large spacecraft into orbit in a lateral direction from the launch vehicle. The system is more efficient in placing two spacecraft in orbit and allows more options for deployment into independent orbits for the independent mission requirements.

Among others, key aspects presented herein include

1. A System Concept for a deployment of two large spacecraft laterally from a launch vehicle into independent orbits about the earth as illustrated in the launch stowed configuration on the launch vehicle in FIG. 2 and the deployment sequence in FIG. 3

2. A Central Deployment Structure as shown in FIG. 1

3. A Half-Hex Spacecraft Configuration shown in FIG. 4 and FIG. 5

4. A Deployment Mechanism shown in FIG. 6, FIG. 7, FIG. 8 and FIG. 9.

5. A Deployment Sequence as shown in FIG. 3 which allows maximum flexibility in deploying two Spacecraft into independent Orbits for independent mission requirements.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. " Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A Dual Spacecraft Deployment System (DSDS) for use with a launch vehicle comprising:

two spacecraft;

a common deployment support structure configured to releasably attach to the two spacecraft; and a release system provided on the common deployment support structure, the release mechanism configured to release the two spacecraft in a direction generally lateral to a flight path of the launch vehicle, wherein the release system comprises:

a latch configured to latch to a latching element on the spacecraft;

an actuator configured to open and close the latch by rotating the latch around the latching element to release the latching element; and a compression source biased against a surface of the spacecraft when in a latched position.

2. The DSDS according to claim 1, wherein the release system includes a mechanical release system that is configured to independently release each of the two spacecraft.

3. The DSDS according to claim 1, wherein the common deployment interface comprises: a vertical structure with a horizontal hexagonal shaped base for releasably attaching to two spacecraft.

4. The DSDS of claim 1, wherein the release system comprises a plurality of actuators and a release sequencing configured to tailor a tip-off release of each of the two spacecraft.

5. The DSDS according to claim 1, wherein the latch comprises a hooked extension having an open portion, wherein the latch is configured to hold a rod shaped latching element on the spacecraft in a first position, and wherein the actuator is configured to open the latch by rotating the hooked extension around the rod shaped latching element to a second position where the open portion of the hooked extension releases the rod shaped latching element.

6. The DSDS according to claim 5, wherein the compression source comprises a spring configured to press the spacecraft away from the common deployment support structure when the open portion of the hooked extension releases the rod shaped latching element.

7. A common deployment support structure for releasing two spacecraft from a launch vehicle, comprising:
  a base for releasably attaching to two spacecraft; and
  a release system provided on the common deployment support structure, the release system being configured to release the two spacecraft in a direction lateral to a flight path of the launch vehicle, wherein the release system comprises:
    a latch configured to latch to a latching element on a spacecraft;
    an actuator configured to open and close the latch by rotating the latch around the latching element to release the latching element; and
    a compression source biased against a surface of the spacecraft when in a latched position.

8. The common deployment support structure according to claim 7, wherein the release system is a mechanical release system configured to independently release the two spacecraft.

9. The common deployment support structure according to claim 7, wherein the release system further comprises:
  a cone configured to interoperate with a cup provided at an interface to the spacecraft when the spacecraft is in a latched position.

10. The common deployment support structure according to claim 7, wherein the common deployment interface comprises a center panel extending from the base between the two spacecraft.

11. The common deployment support structure according to claim 7, wherein the base comprises a hexagon shape.

12. The common deployment support structure according to claim 7, wherein at least one of the attachment points is provided at an outer circumference of the base.

13. The common deployment support structure according to claim 7, wherein the latch comprises a hooked extension having an open portion, wherein the latch is configured to hold a rod shaped latching element on the spacecraft in a first position, and wherein the actuator is configured to open the latch by rotating the hooked extension around the rod shaped latching element to a second position where the open portion of the hooked extension releases the rod shaped latching element.

14. The common deployment support structure according to claim 7, wherein the source of compression comprises a biasing element.

15. The common deployment support structure according to claim 14, wherein the energy source and biasing element is a spring.

16. A spacecraft and common deployment support structure for releasing the spacecraft from the common deployment support structure, the spacecraft comprising:
  an outer housing comprising a half hexagon cross-sectional shape, wherein the spacecraft is configured to be received in the common deployment support adjacent to a portion of the common deployment support structure configured to accept at least one additional payload spacecraft; and
  a rod shaped latching element configured to be held to the common deployment support structure by a hooked extension that rotates around the rod shaped latching element to release the rod shaped latching element.

17. The spacecraft and common deployment support structure according to claim 16, wherein the spacecraft is configured to be released from the common deployment support structure in a direction lateral to a flight path of launch vehicle in which the common deployment support structure is comprised.

18. The spacecraft and common deployment support structure of claim 16, wherein a primary launch vehicle axial load is carried directly through the base of the spacecraft into a launch vehicle interface.

19. A deployment mechanism for releasably latching a spacecraft to a common deployment support structure, the deployment mechanism comprising:
  a latch configured to latch the spacecraft to a common deployment support structure;
  an actuator operably coupled to the latch for mechanically engaging and releasing the latch by rotating the latch around a latching element at the spacecraft to release the latching element; and
  a compression source biased between the common deployment support structure and the spacecraft when latched.

20. The deployment mechanism of claim 19, further comprising;
  a cup coupled to the spacecraft;
  a cone coupled to the common deployment support structure and configured to abut the cup when the spacecraft is latched; and
  a timing wheel configured to control the timing of a release of the latch.

21. A method of deploying two spacecraft from a dual spacecraft deployment structure comprised in a launch vehicle, the method comprising:
  releasably coupling a first spacecraft and a second spacecraft to a common deployment support structure,
  releasing the first spacecraft in a direction substantially parallel to the launch vehicle flight path by rotating a first latch around a first latching element at the first spacecraft to release the first latching element; and
  releasing the second spacecraft in a direction substantially parallel to the launch vehicle flight path by rotating a second latch around a second latching element at the second spacecraft to release the second latching element.

22. The method of claim 21, wherein a portion of a housing of the first spacecraft couples to a first portion of a base of the common deployment support structure and a portion of a housing of the second spacecraft couples to a second portion of the base of the central deployment structure.

23. The method of claim 21, wherein at least one of the first spacecraft and the second spacecraft are placed into orbit using a propulsion capability of the corresponding spacecraft.

24. The method of claim 21, further comprising staggering a rotation of a plurality of latches to tailor a tip off release of each of the first spacecraft and the second spacecraft.

25. The method of claim 22, wherein the second spacecraft is placed into an alternate orbit with the use of an additional quantity of propellant carried with the second spacecraft and by releasing the second spacecraft at a different time that the first spacecraft.

26. The method of claim 25, further comprising:
moving the dual spacecraft deployment structure to a second position after releasing the first spacecraft and before releasing the second spacecraft.

* * * * *